UNITED STATES PATENT OFFICE.

HORACE BILLINGS, OF BEARDSTOWN, ILLINOIS.

COMPOSITION FOR COVERING HAMS, &c.

Specification forming part of Letters Patent No. 7,256, dated April 9, 1850; Reissue No. 195, dated March 25, 1851.

*To all whom it may concern:*

Be it known that I, HORACE BILLINGS, of Beardstown, in the county of Cass and State of Illinois, have invented a new and Improved Composition for Coating or Covering Bacon, Hams, or other Meats, or for covering cheese, fruits, vegetables, &c., for the purpose of preserving them by the total exclusion of moisture and all atmospheric influences; and I do hereby declare that the following is a full and clear description thereof, to wit:

Place fifty pounds of good rosin and twenty pounds of gum-shellac or seed-lac in a suitable vessel, and raise their temperature to such a degree that they can be thoroughly incorporated with each other, then add thereto six quarts of linseed-oil, (or other oil of a similar nature,) and keep up the temperature and continue the agitation of the mass until all signs of evaporation shall have ceased, when the composition will present a bright frothy appearance, and will be ready for use.

For preserving hams or other meats they should first be covered with paper and canvas, or any other suitable preparatory covering, secured in any suitable or usual manner, and then be immersed in the above-described preserving composition while it is in a melted state, and be immediately removed therefrom and hung up to dry. Cheese, fruits, vegetables, &c., should also be first covered with some suitable flexible material before thus immersing them in the said preserving composition. In a very few minutes after thus coating meats, cheeses, fruits, or vegetables and hanging them up to dry, they will be in a proper state for packing down into boxes or casks for shipment.

The coating produced upon the surface of articles by dipping them into my improved preserving composition is so tough and elastic as not to be injured by handling them, and is perfectly impervious to moisture.

It is possible that the proportions of the respective ingredients made use of in the formation of my preserving composition may be slightly varied without essential injury, and therefore I do not intend to limit myself to the exact proportions of the said ingredients, as above specified.

I do not intend to claim as my invention the covering of meats or other articles with paper and cloth or other flexible material previous to coating them with my preserving composition; but What I do claim as my invention, and desire to secure by Letters Patent, is—

The formation of a preserving composition for coating meats, cheeses, fruits, vegetables, &c., by the union of rosin, shellac, (or seed-lac,) and linseed-oil, (or other oil of a similar nature,) substantially in the manner and in nearly the proportions as herein set forth.

HORACE BILLINGS.

Witnesses:
W. CHASE,
AMOS BILLINGS.